United States Patent
Rivas

(10) Patent No.: US 6,201,327 B1
(45) Date of Patent: Mar. 13, 2001

(54) SYSTEM AND METHOD FOR ABSORBING THE EXPANSION AND CONTRACTION OF INTERNAL FLUIDS OF A SUMERGIBLE ELECTRIC MOTOR

(75) Inventor: Olegario Rivas, Bartlesville, OK (US)

(73) Assignee: Camco International, Inc., Houston, TX (US)

( * ) Notice: Subject to any disclaimer, the term of this patent is extended or adjusted under 35 U.S.C. 154(b) by 0 days.

(21) Appl. No.: 09/442,145

(22) Filed: Nov. 17, 1999

(51) Int. Cl.$^7$ .............................. H02K 5/10; H02K 5/132; F04D 13/08
(52) U.S. Cl. ........................ 310/87; 417/421; 417/423.9
(58) Field of Search ........................ 310/87, 85; 417/421, 417/414, 423.9, 423.11

(56) References Cited

U.S. PATENT DOCUMENTS

| | | |
|---|---|---|
| 358,921 | 12/1974 | Dunbar .................................. 310/87 |
| 918,596 | 4/1909 | Reist . |
| 1,610,726 | 12/1926 | Arutunoff . |
| 1,701,468 | 2/1929 | Arutunoff . |
| 1,872,111 * | 8/1932 | Bricken ................................. 310/87 |
| 1,949,796 * | 3/1934 | Himmel ............................... 417/421 |
| 2,001,649 | 5/1935 | Arutunoff .............................. 172/36 |
| 2,275,679 * | 3/1942 | Myers et al. ......................... 417/421 |
| 2,674,194 | 4/1954 | Arutunoff ............................. 103/87 |
| 2,682,229 | 6/1954 | Luenberger ........................... 103/87 |
| 3,426,691 | 2/1969 | Anderson ............................. 103/87 |
| 3,746,472 * | 7/1973 | Rupp .................................... 310/87 |
| 3,785,753 | 1/1974 | Bognanov et al. .................. 417/424 |
| 4,575,315 * | 3/1986 | Galais et al. ........................ 417/365 |
| 4,992,689 | 2/1991 | Bookout ................................ 310/87 |
| 5,367,214 | 11/1994 | Turner, Jr. ............................. 310/87 |
| 5,554,897 | 9/1996 | Martin et al. ......................... 310/54 |
| 5,622,222 | 4/1997 | Wilson et al. .................... 166/105.4 |
| 5,796,197 | 8/1998 | Bookout ................................ 310/85 |

FOREIGN PATENT DOCUMENTS

| | | | |
|---|---|---|---|
| 0 490 846 | 6/1992 | (EP) | ................................ B01F/7/00 |
| 2 336 474 | 10/1999 | (GB) | ............................ F04D/13/08 |
| 2 336 946 | 11/1999 | (GB) | ............................ F04D/13/08 |
| 2 343 207 | 5/2000 | (GB) | ............................ E21B/43/12 |

* cited by examiner

*Primary Examiner*—Burton Mullins
(74) *Attorney, Agent, or Firm*—Fletcher, Yoder & Van Someren

(57) ABSTRACT

A motor protector for use in protecting an electric motor in a subterranean environment. The motor protector utilizes a dual chamber system for absorbing the expansion and contraction of the internal fluids of a submergible electric motor. One of the chambers provides for the expansion and contraction of the internal fluids of a submergible electric motor. The other chamber is in fluid communication with the subterranean environment. A gas pocket is disposed within the motor protector between and in fluid communication with both of the dual chambers. The volume of gas couples the fluid pressure of the subterranean environment to the internal fluids of the electric motor without direct contact between the internal fluids of the electric motor and fluids from the subterranean environment.

24 Claims, 3 Drawing Sheets

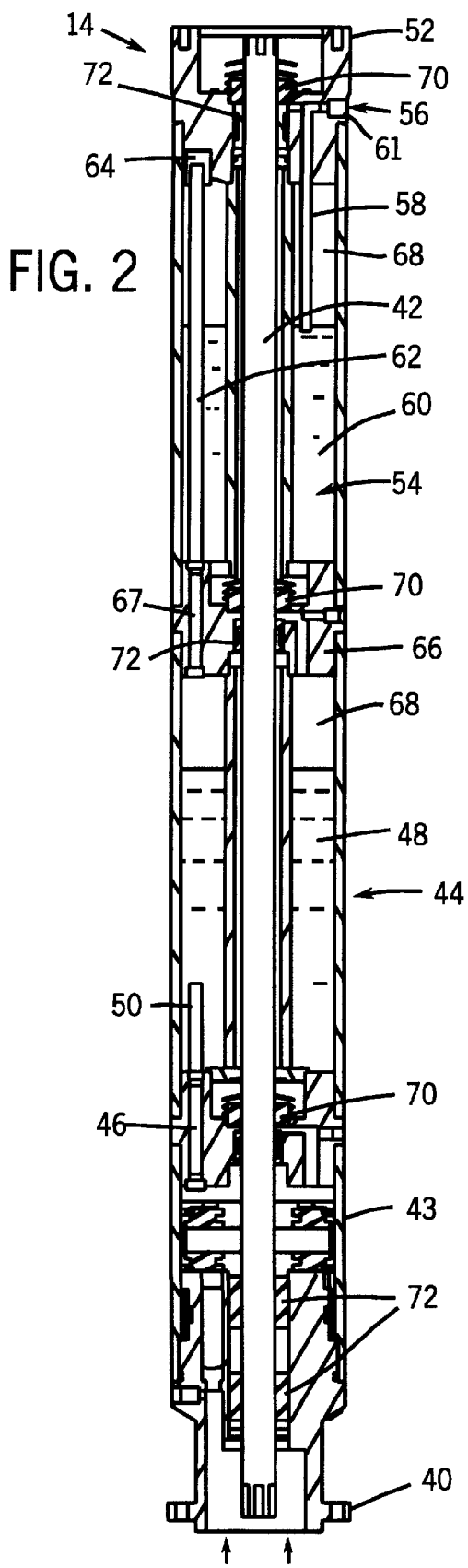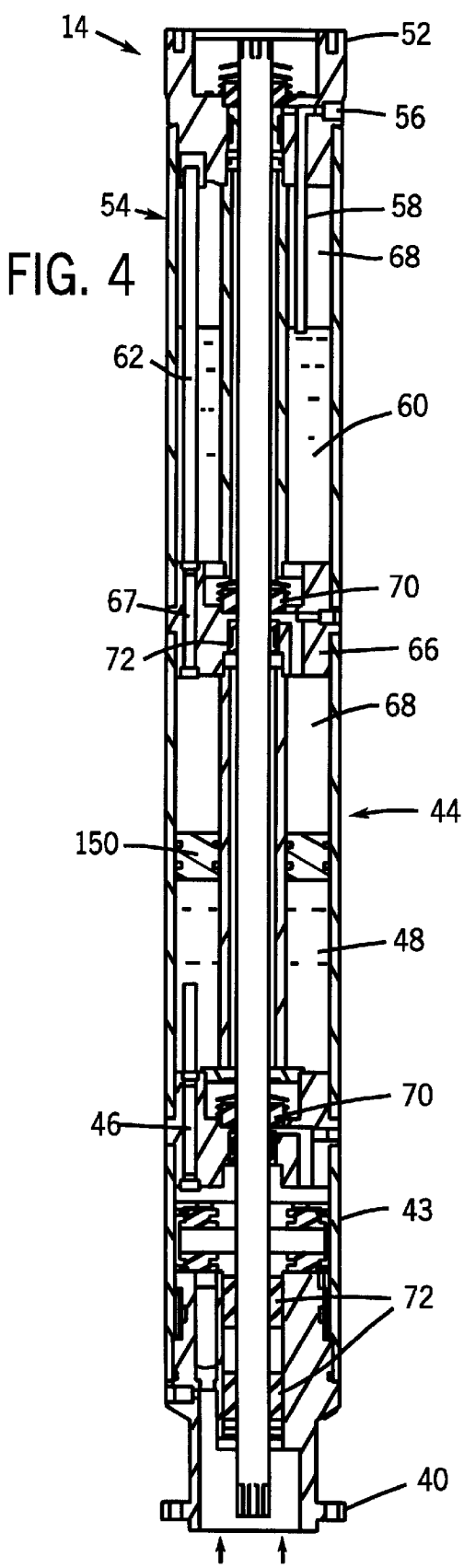

SYSTEM AND METHOD FOR ABSORBING THE EXPANSION AND CONTRACTION OF INTERNAL FLUIDS OF A SUMERGIBLE ELECTRIC MOTOR

FIELD OF THE INVENTION

The present invention relates generally to downhole pumping systems, and more particularly to a motor protector for use with a downhole pumping system.

BACKGROUND OF THE INVENTION

Electric submergible pumping systems are widely used throughout the world for moving subterranean fluids to a desired location, e.g. the earth's surface. These electric submergible pumping systems include an electric motor that is drivingly coupled to a pump. Generally, the electric motors used for such applications are rotary motors containing a rotor and a stator. Typically, the rotor lies within a fluid filled cavity within the stator. The fluid not only lubricates the motor, but also cools the motor to prevent overheating.

However, deleterious materials, such as carbon dioxide, hydrogen sulfide and brine, can be found in the subterranean fluids. Those substances can corrode, or otherwise harm components within the electric motors, causing the motor to fail prematurely. Therefore, the cavities within the electric motors are usually filled with uncontaminated motor oil to ensure their long-term successful operation.

The temperature of the motor oil varies as a result of the intermittent operation of the electric motor and the temperature of the fluid surrounding the electric motor. As the temperature of the motor oil rises, for instance, the oil tends to expand and the pressure within the motor tends to increase.

In most submergible pumping systems in use today, this motor oil is partially contained within a device commonly referred to as a motor protector. Motor protectors may serve several different functions. The motor protectors may serve to prevent well fluids and gases from contaminating the motor oil, transmit the torsional power produced by the electric motor to the pump, provide a storage reservoir of motor oil, provide for the expansion and contraction of the motor oil due to changes in temperature, and to equalize the internal pressure of the motor with the pressure of the surrounding subterranean fluids.

Several different approaches have been used to construct motor protectors. One type of motor protector is generally referred to as a "labyrinth" system. Labyrinth systems are exposed at one end to the subterranean fluids and to the electric motor at the other end. These systems retard the migration of subterranean fluid into the electric motor. However, the subterranean fluids can eventually migrate through the labyrinth path to enter the electric motor.

Another approach, referred to as "bladder" or "bag" system, utilizes an elastomeric barrier between the motor oil and the subterranean fluids. However, elastomeric bags suffer from several limitations. First, the repeated expansion and contraction of the elastomeric bag can cause the bag to split or crack under certain conditions. Of course, once an elastomeric bag splits or cracks it no longer protects the motor oil from contaminants which are then free to enter and ultimately damage the motor. Second, elastomeric bags tend to lose their elasticity due to various conditions which may be present in a wellbore. Once an elastomeric bag loses its elasticity, it can no longer expand and contract as needed to satisfy the requirements of the motor oil which it contains. Eventually the bag ruptures, leaving the contaminants free to attack the motor. Third, most elastomers cannot survive in environments where the temperature rises above about 400° F. Above that temperature, most elastomers become brittle causing the bag to break during expansion or contraction. Finally, elastomeric compounds currently used for motor protector bags tend to be relatively permeable as compared to the contaminants within the wellbore fluid. Many wells contain contaminants, such as hydrogen sulfide for instance, which can permeate the motor protector bag and attack the motor. In fact, certain contaminants, such as hydrogen sulfide, also tend to alter the chemistry of some elastomers, causing the elastomers to harden. Once the elastomer has hardened, the bag eventually breaks.

It would be advantageous to have a submergible pumping system that provides the desired functions of a motor protector but without the limitations of the labyrinth or bag systems.

SUMMARY OF THE INVENTION

The present invention features a system for absorbing the expansion and contraction of internal fluids of an electric motor. The system is comprised of a motor protector having: a first chamber in fluid communication with electric motor internal fluid, a second chamber in fluid communication with an environmental fluid, a communication passage in fluid communication with the first chamber and the second chamber, and a volume of gas between the electric motor internal fluid in the first chamber and the environmental fluid in the second chamber.

According to another aspect of the invention, a pumping system is featured that is designed for submersion in a production fluid disposed in a wellbore. The pumping system includes a submergible pump and a submergible motor coupled to the submergible pump and having an internal motor fluid. A motor protector is coupled to the submergible motor. The motor protector interior is exposed to the production fluid and to the internal motor fluid. Additionally, the motor protector has a gas pocket disposed intermediate to and in contact with the production fluid and the internal motor fluid.

According to another aspect of the invention, a method is provided for allowing the expansion and contraction of the internal fluids of an electric motor of a submergible system. The method includes the step of fluidicly coupling an electric motor internal fluid from an electric motor to a first chamber. The first chamber has sufficient volume to contain any expected increase in electric motor internal fluid volume resulting from an increase in electric motor internal fluid temperature due to operation of the electric motor and heat from the surrounding environment. Other steps of the method include: providing a pressure barrier that allows fluid from the surrounding environment to flow into a second chamber at a predetermined pressure, fluidicly coupling the first chamber and second chamber in such a manner as to allow a gas pocket to form between the first chamber and second chamber, and inserting a sufficient volume of gas to maintain a gas pocket between the first chamber and the second chamber at the operating depth of the submergible system and with the electric motor operating.

BRIEF DESCRIPTION OF THE DRAWINGS

The invention will hereafter be described with reference to the accompanying drawings, wherein like reference numerals denote like elements, and:

FIG. 2 is a cross-sectional view of a submergible system taken generally along an axis of the system, according to an embodiment of the present invention;

FIG. 4 is a cross-sectional view of a submergible system taken generally along an axis of the system, according to an alternative embodiment of the present invention.

DETAILED DESCRIPTION OF THE PREFERRED EMBODIMENTS

Figure 1:
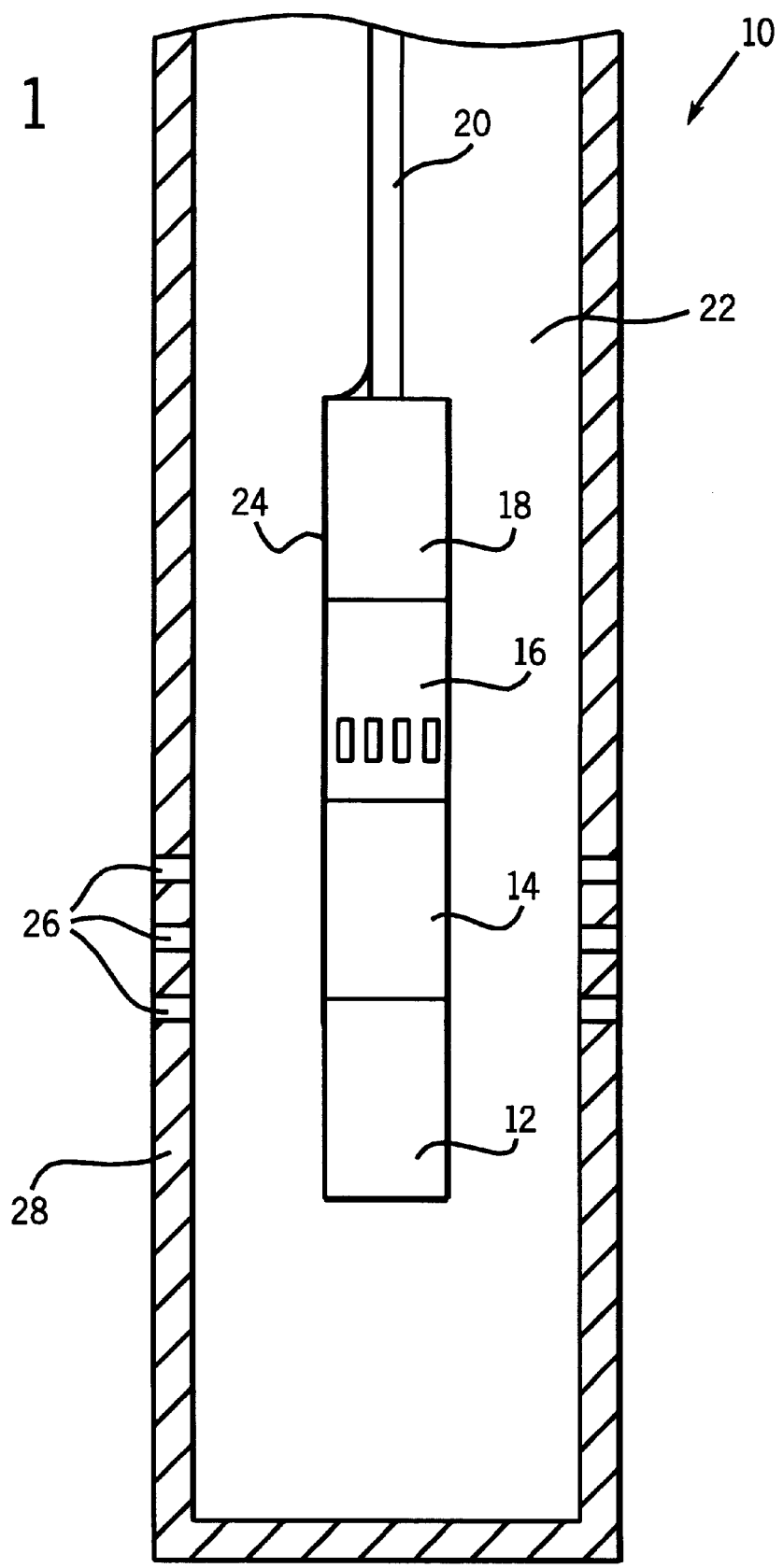
FIG. 1 is a front elevational view of a pumping system disposed in a wellbore, according to an embodiment of the present invention.

Referring generally to FIG. 1, a submergible system 10 is illustrated according to an exemplary embodiment of the present invention. The submergible system 10 of the illustrated embodiment is an electric submergible pumping system. The submergible system 10 is comprised of a submergible electric motor 12, a motor protector 14, a fluid intake 16 and a submergible pump 18. The submergible electric motor 12 is drivingly coupled to the submergible pump 18 through the motor protector 14 and the fluid intake 16. Fluid is drawn into the submergible pump 14 through the fluid intake 16 when the submergible electric motor 12 is operated. The submergible electric motor 12 is comprised of a rotor and stator. The rotor sits within the stator in a fluid-filled cavity. The fluid serves to lubricate and cool the rotor and stator.

The submergible system 10 is deployed by a support system 20 into a wellbore 22. The support system 20 also includes an electrical power cable 24 that couples electrical power to the submergible electric motor 12 from the surface. The support system 20 may be a wireline deployed system or, as illustrated, a coiled tubing deployed system. The coiled tubing also can serve to convey the fluid discharge of the submergible pump 18 to the surface.

As illustrated, the submergible system 10 is deployed into a wellbore 22 to displace fluids from the wellbore 22 to the surface. Fluids enter the wellbore 22 from a surrounding geologic formation through perforations 26 in a wellbore casing 28. The pressure of the fluid surrounding the submergible system 10 increases as the submergible system 10 is lowered into the wellbore 22. The pressure of the fluid in the wellbore 22 is coupled by the motor protector 14 to the fluid within the submergible electric motor 12. Thus, any pressure difference between the wellbore 22 and the interior of the submergible electric motor 12 is minimized. Most importantly, the motor protector 14 prevents the fluids from the wellbore 22 from coming into direct contact with the fluid within the submergible electric motor 12.

The submergible system 10 is lowered into the wellbore 22 until a desired depth is achieved. Once the desired depth in the wellbore 22 is achieved, the submergible electric motor 12 is energized to drive the submergible pump 18 to displace fluid from the wellbore 22. The operation of the submergible electric motor 12 causes the fluids within the electric motor to heat up. The increase in temperature of the fluids within the submergible electric motor 12 causes these fluids to expand into the motor protector 14. However, the motor protector 14 prevents the expanding fluids from coming into contact with the fluids from the wellbore 22.

Referring generally to FIG. 2, an exemplary embodiment of a motor protector 14 is shown. In the illustrated embodiment, motor oil is used to fill the interior of the submergible electric motor 12 housing the rotor. The motor protector 14 absorbs the expansion and contraction of motor oil arising from heating and cooling of the motor oil. The motor protector 14 also couples the pressure in the surrounding wellbore 22 to the motor oil within the submergible electric motor 12 without direct contact between the fluids in the wellbore and the motor oil. Additionally, the motor protector 14 is part of the drive train that drivingly couples the submergible electric motor 12 to the submergible pump 18.

The motor protector 14 is coupled to the submergible electric motor 12 by a first end 40. The first end 40 serves several coupling functions. First, first end 40 mechanically couples the motor protector 14 to the submergible electric motor 12. Additionally, the first end 40 drivingly couples the submergible electric motor 12 to a drive shaft 42. Protector 14 further includes an axial thrust bearing assembly 43 mounted above end 40 as illustrated in FIG. 2. The secure coupling of motor 12 with end 40 permits internal motor fluid, e.g. motor oil, to flow into motor protector 14, and specifically into a first chamber 44 within the motor protector 14. A first fluid passageway 46 conveys motor fluid, e.g. a motor oil 48, to and from the first chamber 44 via a first chamber inlet tube 50 within the first chamber 44.

Motor protector 14 also includes a second end 52. The second end 52 couples the motor protector 14 to a subsequent tool in the tool string, e.g. fluid intake 16. The second end 52 also fluidicly couples the fluid in the wellbore 22, surrounding the motor protector 14, to a second chamber 54 within the motor protector. A communication port 56 in the second end 52 and a wellbore fluid conduit 58 communicate wellbore fluids 60 to the second chamber 54.

Communication port 56 preferably includes a pressure activated device 61, such as a rupture disc. The rupture disc allows wellbore fluid 60 to enter the second chamber 54 when the pressure in the wellbore 22 surrounding the motor protector 14 reaches a predetermined value. Prior to rupture, the rupture disc maintains a seal to prevent fluid from entering or leaving through the communication port 56 until that wellbore pressure is achieved. Once the rupture disc has ruptured, the wellbore fluid conduit 58 will communicate wellbore fluid 60 from the communication port 56 to second chamber 54. The pressure activated device 61 ensures that a gas pocket is contained within motor protector 14 intermediate motor oil 48 and the wellbore fluid, as will be more fully explained below.

The motor oil 48 in the first chamber 44 is exposed to the pressure of the wellbore fluid in the second chamber 54 by a communication passage 62, such as a tube, within the motor protector 14. In the illustrated embodiment, the second chamber 54 is disposed directly above the first chamber 44. The communication passage 62 extends downward from cavity 64 in the top of the second chamber 54 to a bearing support structure 66. A fluid passageway 67 is disposed through the support structure 66 to fluidicly couple the communication passage 62 to the top of the first chamber 44. A pocket or volume of gas 68 occupies the space between motor oil 48 and wellbore fluid 60. Preferably, the gas 68 occupies the upper region of the second chamber 54, communication passage 62, fluid passage 67 and the upper region of chamber 44. The volume of gas 68 allows the pressure of the wellbore fluids to be conveyed to the motor oil 48 without direct contact between the wellbore fluids 60 and the motor oil 48. In the exemplary embodiment, nitrogen is used as the gas in gas pocket 68, although other gases or gas mixtures can be used.

During deployment of system 10, the pressure of the wellbore fluids 60 surrounding the submergible system 10 rises as the submergible system 10 is lowered into the wellbore. At a predetermined depth, the wellbore fluid pressure overcomes the rupture disc and wellbore fluid flows through the communication port 56 and the wellbore fluid conduit 58 into the second chamber 54. The pressure of the wellbore fluid 60 in the second chamber 54 on one side of the volume of gas 68 and the force of the incompressible motor oil in the first chamber on the other side of the volume of gas compresses the volume of gas 68 between the two fluids. Consequently, the volume of the gas decreases as the submergible system is lowered into the wellbore.

During operation of system 10, the motor protector 14 of the illustrated embodiment provides an expansion volume for an increase in temperature of the motor oil. The temperature of the motor oil rises when the submergible electric motor is operated. The motor oil may also rise from the heat of the wellbore fluid surrounding the submergible system. Any increase in temperature corresponds to an increase in volume of the motor oil. The expansion in fluid volume causes the fluid to expand through the first end 40 and into chamber 44 of motor protector 14. The pressure of the expanding motor oil in the first chamber on one side of the pocket of gas 68 is equalized with the pressure of the wellbore fluid 60 in the second chamber 54 via gas 68. The pocket of gas 68 allows this equalization without mixing of motor fluid and wellbore fluid. Consequently, the internal motor oil is protected from contamination while allowing equalization of internal and external pressure to avoid damage to motor components, such as seals.

Mechanical seals 70 are placed along the drive shaft to prevent fluids from flowing along the drive shaft and contaminating either the motor oil or volume of gas 68. Also, the drive shaft is supported by several bearings 72 along the length of the drive shaft 42.

In operation, the motor protector 14 preferably maintains a gas pocket at the top of second chamber 54 and within communication tubing 62 when the system is operating at depth in the wellbore. As long as the volume of gas is at least in this condition it will prevent the wellbore fluids 60 from coming into contact with the motor oil 48. A secondary cavity 64 is disposed at the top of second chamber 54 to receive the upper end of communication tube 62. Cavity 64 is configured to minimize the volume of gas 68 needed to prevent wellbore fluids from entering communication passageway 62. A more optimal condition allows the volume of gas 68 to occupy a volume extending from the top of the second chamber 54, through the communication tube 62, and into a portion of the first chamber 44 during even the worst-case scenario.

Preferably, factors tending to compress the volume of gas and the resulting change in the volume of the gas are considered in designing the system. The amount the volume of gas is compressed from the wellbore pressure depends on the initial pressure in the volume of gas and the pressure at the operating depth. The wellbore pressures that the motor protector may experience may rise dramatically as the system travels from the surface to the operating depth. Therefore, the volume of gas may be compressed dramatically between the surface and the operating depth.

Also, the amount the volume of gas is displaced due to increases in the motor oil temperature is directly related to the change in volume of the motor oil resulting from the increase in temperature. The change in volume of the motor oil is a function of the change in temperature, the volume of the motor oil, and the thermal coefficient of expansion of the motor oil. The change in temperature is, in turn, a function of the initial motor oil temperature, the surrounding wellbore temperature and the heat produced within the electric motor from the operation of the electric motor.

To provide more gas, the volume of gas 68 can be pressurized before lowering the system into the wellbore. With higher initial gas pressure, the volume of gas is compressed less as the system is moved downhole. However, the initial pressure to which the volume of gas can be pressurized is limited by the maximum differential pressure that can be withstood by internal components, such as mechanical seals, within the motor protector. In fact, limiting the differential pressure across these system components is the reason for exposing the motor oil to wellbore pressure.

Figure 3:
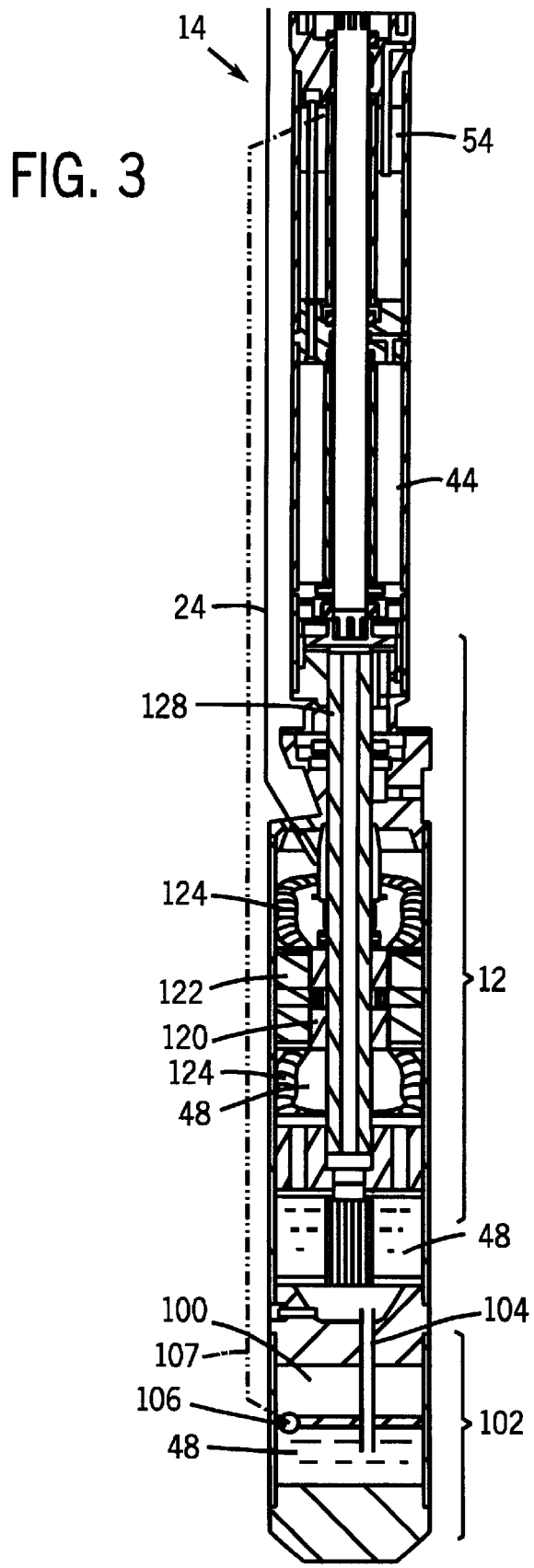
FIG. 3 is a cross-sectional view of a submergible system taken generally along an axis of the system, according to an alternative embodiment of the present invention.

Referring generally to FIG. 3, an additional supply of pressurized gas 100 can be used to supplement the initial volume of gas. The additional supply of pressurized gas 100 can be used to supplement the volume of gas 68. Generally, the addition of pressurized gas 100 to gas 68 is designed to increase equalization with the wellbore pressure, to provide a larger pocket of gas between the motor fluid and the wellbore fluid.

The supply of pressurized gas 100 can be disposed in a tank or chamber within either of the first chamber 44 or the second chamber 54 or coupled to the volume of gas from a remote location. As illustrated, the supply of pressurized gas 100 is disposed below the submergible electric motor 12 in a lower chamber 102. Motor oil 48 is coupled from the motor 12 through a third fluid passageway 104 to the lower chamber 102. The motor oil pressure is felt by a flow initiator 106, such as a pressure actuated valve. When the motor oil pressure has risen to a predetermined level, the flow initiator 106 is activated to permit pressurized gas 100 to flow into a conduit 107, such as a high pressure hose, that is coupled to the top of the second chamber 54 to permit gas 100 to flow into volume of gas 68. The pressurized gas also can be controlled in response to other parameters, such as the level of wellbore fluid in the second chamber, for example.

FIG. 3 also illustrates the internal construction of an exemplary submergible electric motor 12. The submergible electric motor 12 is comprised primarily of a stator 120, a rotor 122, a top end coil 124, a bottom end coil 126, and a motor shaft 128. Electrical power is supplied to the submergible electric motor 12 from the surface through electrical power cable 24 from the surface. The electrical circuit within the submergible electric motor is formed between the stator 120, rotor 122, the top end coil 124, and the bottom end coil 126. The motor shaft 128 transmits the rotational torque produced by the submergible electric motor 12. The rotor 122 is coupled to the motor shaft 128. Thus, when rotation is induced in the rotor 122, the motor shaft 128 is able to drive a tool, e.g. pump, coupled to the motor shaft 128. The interior of the submergible electric motor 12 contains motor oil 48.

As illustrated in FIG. 4, the volume of gas 68 interfaces with the motor oil 48 in the first chamber 44. It may be desirable to prevent contact between the motor oil 48 and the volume of gas 68 to help avoid gas becoming entrained within the motor oil. Therefore, a barrier can be placed in the first chamber to prevent contact between the volume of gas and the motor oil. As illustrated, one example of such a barrier is a piston 150 floating on the surface of the motor oil. A piston can be placed in the second chamber 54 to prevent or minimize contact between the wellbore fluids 60 and the volume of gas 68.

It will be understood that the foregoing description is of preferred exemplary embodiments of this invention, and that the invention is not limited to the specific forms shown. For example, in the illustrated embodiments the two chambers are oriented with the second chamber above the first chamber. However, the two chambers can be oriented in a number of different orientations and still serve the same function. Reference has been made to motor oil as the fluid within the submergible electric motor. The present invention is not limited by the type of fluid used within the submergible electric motor. These and other modifications may be made in the design and arrangement of the elements without departing from the scope of the invention as expressed in the appended claims.

What is claimed is:

1. A system for absorbing the expansion and contraction of internal fluids of an electric motor, comprising a motor protector having:
    an outer housing disposed about:
        a longitudinal drive shaft;
        a first chamber in fluid communication with electric motor internal fluid;
        a second chamber disposed for fluid communication with an environmental fluid;
        a communication passage in fluid communication with the first chamber and the second chamber; and
        a volume of gas disposed for capture intermediate the electric motor internal fluid in the first chamber and the environmental fluid in the second chamber during operation of the system; and
        a motor connector end configured to drivingly couple a submersible electric motor to the longitudinal drive shaft.

2. The system as recited in claim 1, wherein the volume of gas is sufficient to prevent the electric motor internal fluid from coming into direct contact with the environmental fluid when the motor protector is disposed in a wellbore.

3. The system as recited in claim 1, further comprising a source of supplemental gas fluidicly coupled to the volume of gas.

4. The system as recited in claim 1, wherein the communication passage comprises a generally vertical passage.

5. The system as recited in claim 1, further comprising a drive shaft disposed through the first chamber and the second chamber.

6. The system as recited in claim 1, wherein the volume of gas comprises nitrogen.

7. The system as recited in claim 1, wherein the electric motor internal fluid occupies a portion of the first chamber, the environmental fluid occupies a portion of the second chamber, and the remainder of the first chamber, the second chamber, and the communication passage is occupied by the volume of gas.

8. A system for absorbing the expansion and contraction of internal fluids of an electric motor, comprising a motor protector having:
    a first chamber in fluid communication with electric motor internal fluid;
    a second chamber disposed for fluid communication with an environmental fluid;
    a communication passage in fluid communication with the first chamber and the second chamber;
    a volume of gas disposed for capture intermediate the electric motor internal fluid in the first chamber and the environmental fluid in the second chamber during operation of the system; and
    a barrier to fluid flow disposed between the second chamber and the surrounding environment, wherein the barrier is removed when exposed to a sufficient external pressure.

9. The system as recited in claim 8, wherein the electric motor internal fluid occupies a portion of the first chamber, the environmental fluid occupies a portion of the second chamber, and the remainder of the first chamber, the second chamber, and the communication tube is occupied by the volume of gas.

10. The system as recited in claim 9, wherein the volume of gas is compressed in response to increases in the pressure exerted by the environmental fluid.

11. A system for absorbing the expansion and contraction of internal fluids of an electric motor, comprising a motor protector having:
    a first chamber in fluid communication with electric motor internal fluid;
    a second chamber disposed for fluid communication with an environmental fluid;
    a communication passage in fluid communication with the first chamber and the second chamber; and
    a volume of gas disposed for capture intermediate the electric motor internal fluid in the first chamber and the environmental fluid in the second chamber during operation of the system, wherein an upper opening of the communication passage is disposed in an upper region of the first chamber, and a lower opening of the communication passage is disposed in an upper region of the second chamber.

12. A system for absorbing the expansion and contraction of internal fluids of an electric motor, comprising a motor protector having:
    a first chamber in fluid communication with electric motor internal fluid;
    a second chamber disposed for fluid communication with an environmental fluid;
    a communication passage in fluid communication with the first chamber and the second chamber;
    a volume of gas disposed for capture intermediate the electric motor internal fluid in the first chamber and the environmental fluid in the second chamber during operation of the system; and
    a floating partition disposed intermediate the electric motor internal fluid and the environmental fluid.

13. A pumping system designed for submersion in a production fluid disposed in a wellbore, comprising:
    a submergible pump;
    a submergible motor coupled to the submergible pump and having an internal motor fluid;
    a motor protector coupled to the submergible motor, the motor protector having an interior exposed to the production fluid and to the internal motor fluid, the motor protector further having a gas pocket disposed intermediate to and in contact with the production fluid and the internal motor fluid, wherein the motor protector comprises an upper cavity exposed to one of the production fluid and the internal motor fluid and a lower cavity exposed to the other of the production fluid and the internal motor fluid.

14. A pumping system designed for submersion in a production fluid disposed in a wellbore, comprising:
    a submergible pump;
    a submergible motor coupled to the submergible pump and having an internal motor fluid; and
    a motor protector coupled to the submergible motor, the motor protector having an interior exposed to the production fluid and to the internal motor fluid, the motor protector further having a gas pocket disposed intermediate to and in contact with the production fluid and the internal motor fluid, wherein the motor protector includes an upper cavity exposed to the production fluid and a lower cavity exposed to the internal motor fluid.

15. The pumping system as recited in claim 14, wherein the upper cavity and the lower cavity are in fluid communication via a passage.

16. The pumping system as recited in claim 15, wherein the passage comprises a tube filled by a gas of the gas pocket.

17. The system as recited in claim 16, further comprising a remote source of pressurized gas that is placed in communication with the gas pocket when exposed to sufficient wellbore pressure.

18. The pumping system as recited in claim 16, wherein the gas comprises nitrogen.

19. The pumping system as recited in claim 16, further comprising a barrier that permits entry of the production fluid into the upper cavity only after exposure to a given pressure greater than atmospheric pressure.

20. A method of providing for the expansion and contraction of the internal fluids of an electric motor of a submergible system, comprising;

fluidicly coupling an electric motor internal fluid from an electric motor to a first chamber of sufficient volume to contain any expected increase in electric motor internal fluid volume resulting from an increase in electric motor internal fluid temperature;

providing a pressure barrier to allow fluid from the surrounding environment to flow into a second chamber at a predetermined pressure;

fluidically coupling the first chamber and second chamber in a manner to allow a gas pocket to form between the first chamber and second chamber; and inserting a sufficient volume of gas to maintain a gas pocket between the first chamber and the second chamber at the operating depth of the submergible system.

21. The method as recited in claim 20, further comprising lowering the submergible system into a wellbore.

22. The method as recited in claim 20, further comprising supplying the volume of gas with additional volume of gas after the system is lowered into the wellbore.

23. The method as recited in claim 20, further comprising operating the electric motor of the submergible system.

24. The method as recited in claim 20, further comprising inserting a floating piston in the first chamber intermediate the electric motor internal fluid and fluid from the surrounding environment.

* * * * *